US009335196B2

(12) United States Patent
Kolahi et al.

(10) Patent No.: US 9,335,196 B2
(45) Date of Patent: May 10, 2016

(54) METHOD FOR OPERATING A RESONANCE MEASURING SYSTEM (75) Inventors: Kourosh Kolahi, Duisburg (DE); Ralf Storm, Essen (DE); Andreas Poremba, Wuppertal (DE)

(73) Assignee: KROHNE Messtechnik GmbH, Duisburg (DE)

( * ) Notice: Subject to any disclaimer, the term of this patent is extended or adjusted under 35 U.S.C. 154(b) by 455 days.

(21) Appl. No.: 13/883,150

(22) PCT Filed: Apr. 27, 2012

(86) PCT No.: PCT/EP2012/001824
§ 371 (c)(1),
(2), (4) Date: Aug. 14, 2013

(87) PCT Pub. No.: WO2012/146386
PCT Pub. Date: Nov. 1, 2012

(65) Prior Publication Data
US 2013/0317760 A1 Nov. 28, 2013

(30) Foreign Application Priority Data
Apr. 29, 2011 (DE) .......................... 10 2011 100 092

(51) Int. Cl.
*G01F 1/00* (2006.01)
*G01F 1/84* (2006.01)
*G01F 25/00* (2006.01)
(52) U.S. Cl.
CPC .............. *G01F 1/84* (2013.01); *G01F 1/8431* (2013.01); *G01F 1/8436* (2013.01); *G01F 25/0007* (2013.01)
(58) Field of Classification Search
CPC ... G01F 1/8409; G01F 1/8477; G01F 1/8431; G01F 1/8413; G01F 15/006; G01F 15/14; G01F 1/8436; G01F 15/024; G01F 25/0007

USPC ............. 702/33, 45, 46; 73/861.355, 861.357
See application file for complete search history.

(56) References Cited

U.S. PATENT DOCUMENTS 4,817,448 A 4/1989 Hargarten et al.
5,231,884 A 8/1993 Zolock
(Continued)

FOREIGN PATENT DOCUMENTS

DE 37 82 818 T2 6/1993
DE 692 14 290 T2 2/1997
(Continued)

OTHER PUBLICATIONS
International Search Report of International Application No. PCT/EP2012/001824 Date of Mailing of the International Search Report Aug. 10, 2012.

*Primary Examiner* — An Do
(74) *Attorney, Agent, or Firm* — Roberts Mlotkowski Safran & Cole, P.C.; David S. Safran (57) ABSTRACT A method for operating a Coriolis mass flow measuring device having at least one measuring pipe through which a medium flows, at least one vibration generator, at least a first vibration sensor, at least a second vibration sensor and at least a control and analyzing unit. The detection of measurement variables or diagnosis parameters is achieved with increased accuracy and security in that the control and analyzing unit calculates, at least indirectly and in a ratiometric manner, at least a derived secondary variable based on a primary measurement, wherein interested primary measurement signals are transmitted alternately to the control and analyzing unit via different measurement channels and wherein, based on the various values obtained from the different measurement channels regarding the primary measurement signals, compensation values of the transmitted primary measurement signals are calculated and used as a basis for the calculation of the derived secondary variable.

16 Claims, 4 Drawing Sheets (56) References Cited

U.S. PATENT DOCUMENTS

| | | |
|---|---|---|
| 5,331,859 A | 7/1994 | Zolock |
| 6,662,120 B2 * | 12/2003 | Drahm et al. .................. 702/43 |
| 7,234,363 B2 * | 6/2007 | Kumpfmuller .......... 73/861.357 |
| 7,904,268 B2 | 3/2011 | Wheeler et al. |

FOREIGN PATENT DOCUMENTS

| | | |
|---|---|---|
| DE | 603 11 897 T2 | 6/2007 |
| EP | 0 300 301 A1 | 1/1989 |
| WO | 88/02105 A1 | 3/1988 |

* cited by examiner

METHOD FOR OPERATING A RESONANCE MEASURING SYSTEM

BACKGROUND OF THE INVENTION

1. Field of the Invention

The invention relates to a method for operating a Coriolis mass flow measuring device, whereby the Coriolis mass flow measuring device has at least one measuring tube through which a medium flows, at least one oscillation generator, at least one first oscillation sensor, at least one second oscillation sensor, and at least one control and analysis unit, whereby excitation signals can be routed to the oscillation generator from the control and analysis unit via at least one excitation channel, whereby a first primary measuring signal of interest can be routed to the control and analysis unit from the first oscillation sensor via at least one first measuring channel, and a second primary measuring signal of interest can be routed to the control and analysis unit from the second oscillation sensor via at least one second measuring channel. Moreover, the invention also relates to a Coriolis mass flow measuring device, with which the above-mentioned method is executed.

2. Description of Related Art

Coriolis mass flow measuring devices are primarily used in industrial process measuring technology, where mass flows have to be determined with high accuracy. The mode of operation of Coriolis mass flow measuring devices is based on the fact that at least one measuring tube through which a medium flows is excited to oscillate by an oscillation generator, whereby the mass-loaded medium is fed back to the wall of the measuring tube based on the Coriolis inertial force produced by two orthogonal velocities—that of the flow and that of the measuring tube. This feedback of the medium to the measuring tube results in a change in the measuring tube's oscillation in comparison to the oscillation state of the measuring tube without flow. By ascertaining these characteristics of the oscillations of the flow measuring tube—phase difference, and thus, time difference between the deviations of two measuring tube regions, which oscillate in phase in the state of the measuring tube without flow—the mass flow through the measuring tube can be determined with high accuracy. In the case of homogeneous media, accuracies of approximately 0.04% of the measurement value can be achieved with high-grade Coriolis mass flow measuring devices, and thus, Coriolis mass flow measuring devices are also frequently used in legal metrology.

The high accuracy requirements can only be maintained when the state of the Coriolis mass flow measuring device is ascertained exactly and values influencing the measuring results are taken into consideration when calculating the mass flow. To this end, information-carrying signals, i.e., the excitation signals (currents and/or voltages) and the primary measuring signals of interest, i.e., the deviations of the measuring tube, are ascertained via measuring channels. Also, other known influencing variables, such as, e.g., temperatures and mechanical voltages at significant points of the measuring tube, can be ascertained via measuring channels and are taken as a basis for determining the mass flow by use of the Coriolis mass flow measuring devices. Such methods are frequently based on a mathematical model of the Coriolis mass flow measuring device, whose internal model parameters are determined during the measuring operation, in such a way that a correction to the mass flow measurement is possible in continuous operation (see, e.g., Schröder, T., Kolahi, K., Röck, H.: "Neuartige Regelung eines Coriolis-Massedurchflussmessers [Novel Adjustment of a Coriolis Mass Flow Measuring Device]," Technisches Messen [Industrial Measurement] 71, 2004, pages 259-268).

Coriolis mass flow measuring devices are suitable not only for determining mass flow, but they can also be used, for example, for determining the fluid density and the viscosity of the medium. Specifically, they are also suitable for ascertaining diagnostic parameters, such as, for example, the ascertaining of a multi-phase flow or the ascertaining of deposits. Also, with respect to these variables, there is strong interest in, as precise as possible, ascertaining of measurement values and primarily continuously precise ascertaining of measurement values. The desire for an ensured precise measurement is motivated particularly also by considerations with respect to safety, for example, to achieve specific safety requirement stages—Safety-Integrity Level (SIL).

SUMMARY OF THE INVENTION

It is therefore an object of this invention to indicate a method for operating a Coriolis mass flow measuring device and a corresponding Coriolis mass flow measuring device, which especially safely allows for ascertaining relevant measurement values or diagnostic parameters with increased accuracy.

The method according to the invention for operating a Coriolis mass flow measuring device, in which the previously deduced and indicated object is achieved, is first characterized in that the control and analysis unit ratiometrically calculates at least one derived secondary variable ($\dot{m}$) at least indirectly from the primary measuring signals transmitted via the measuring channels, whereby the primary measuring signals of interest are routed alternately via the different measuring channels of the control and analysis unit, and balancing values for the transmitted primary measuring signals are calculated from the different values of the transmitted primary measuring signals obtained via the different measuring channels, and the balancing values are taken as a basis for calculating the derived secondary value.

According to the invention, it has been recognized that to achieve a high measuring accuracy, not only are variables that are in direct connection with the structural elements of the Coriolis mass flow measuring device of interest, but rather also the ascertaining and processing of the primary measuring signals that are of interest and that are to be picked up by measuring technology as well as their transmission in the form of signals are of great importance. The above-described high accuracies can then only be achieved if in the case of determining the mass flow, the mass-flow-induced phase shift is not covered or distorted by a phase shift that is caused by the measuring channels. This can mean, for example, that the phase shift that is caused by the measuring channels should not be greater than 0.5 gad in the example. Stability of the measuring channels of, for example, 0.5 wad can be ensured, however, in the conventional way only by quite considerable structural and costly expense for strict compliance with reference conditions and even then only for very short periods—in the secondary range—which is, of course, unsatisfactory.

The method according to the invention is designed to direct primary measuring signals that are of interest—i.e., that are necessary for calculating the derived secondary variable—alternately via the different measuring channels and to route them to the control and analysis unit so that, for example, the first primary measuring signal of interest is temporarily directed via a first measuring channel and is temporarily directed via a second measuring channel, and also, a second primary measuring signal of interest is temporarily directed via the second measuring channel and is temporarily directed via the first measuring channel. This means that the transmission behavior of the different measuring channels has an equivalent effect on the different primary measuring signals of interest and affects the values obtained in the outputs of the measuring channels for the transmitted primary measuring signals. These values for the transmitted primary measuring signals obtained after running through the different measuring channels are then used for calculating balancing values, which produce a numerical average between the different values for the transmitted primary measuring signals. The calculation of the derived secondary variable is then performed with the average/mean value thus obtained.

The primary measuring signals of interest can be, for example, the velocity signals of the oscillation sensor, whereby the first oscillation sensor is provided in the area of the intake side of the measuring tube and the second oscillation sensor is provided in the area of the discharge side of the measuring tube. An especially advantageous effect with respect to the reduction of a measuring error is then produced when the derived secondary variable—typically the mass flow—is calculated ratiometrically from the transmitted primary measuring signals or from the balancing values of the transmitted primary measuring signals, i.e., by forming the ratio of mathematical terms in the balancing values, whereby the balancing values have the same distortion superposition owing to their calculation. In the case of determining the mass flow, the mass flow can be calculated ratiometrically, for example, by forming quotients from the difference of the primary measuring signals, on the one hand, and the sum of the primary measuring signals, on the other hand; this is explained in detail in the form of equations below within the framework of the description of figures.

In a preferred configuration of the method, the balancing values of the transmitted primary measuring signals are calculated by forming the mean values from the different values for transmitted primary measuring signals that are obtained via the different measuring channels, in particular by forming the arithmetic mean value.

In another configuration of the method according to the invention, the primary measuring signals of interest are routed alternately via the different measuring channels to the control and analysis unit so that the different measuring channels are alternately concerned with the transmission of different primary measuring signals of interest. In an alternative configuration of the method, one primary measuring signal of interest each is simultaneously transmitted via different measuring channels to the control and analysis unit, so that values transmitted and obtained simultaneously via different measuring channels are present for the, in each case, one transmitted primary measuring signal, and balancing values can be calculated from these values obtained almost simultaneously for the transmitted primary measuring signals.

Preferably, the measuring period, during which a specific primary measuring signal is transmitted via a measuring channel, lasts until transients of the transmission behavior of the measuring channel have subsided. This has the effect that the different values that are obtained for the transmitted primary measuring signals do not scatter much, in particular namely do not scatter much when the different values for the transmitted primary measuring signals are obtained in succession over time. Further errors can be avoided in that the first measurement values after switching over a measuring channel can be discarded, meaning that undesired transient processes are automatically ignored.

The configuration of the method according to the invention—in which at least one measuring channel is directly exposed to at least one known reference signal, the measuring channel response signal of the loaded measuring channel is ascertained, and in which the transmission function of the measuring channel is determined based on the known reference signal and based on the measuring channel response signal that is ascertained—has turned out to be quite especially advantageous. This is therefore advantageous, since the identified transmission behavior of the measuring channel can be used subsequently for another correction of the transmission behavior of the measuring channels. When the reference signal is known, that means that it is known at the place of its original creation, i.e., for example, in the control and analysis unit—for example, a DSP—where it is generated and therefore can be considered to be known precisely. In a preferred embodiment, the excitation signal for the measuring tube is used simply as a reference signal.

Another especially advantageous embodiment of the method according to the invention comprises at least one excitation channel being directly exposed to at least one known reference signal, the response signal of the exposed excitation channel being ascertained, and the transmission function of the excitation channel being identified based on the known reference signal and based on the acquired excitation channel response signal. Also, here, knowledge of the transmission behavior of the identified excitation channel can be used for measurement value correction.

The known reference signal is output from the control and analysis unit and altered later on by the transmission behavior of the downstream components, as a whole, i.e., by the transmission behavior of the excitation channel that is used and the measuring channel that is used. An adjustment of channels is then carried out virtually on the reference channel thus used.

With the identified transmission function of the measuring channel and/or with the identified transmission function of the excitation channel, preferably the actual transmission behavior of the measuring channel and/or the actual transmission behavior of the excitation channel is corrected—by computer. Preferably, this correction takes place in the frequency range by which namely the respective transmitted signal received by the control and analysis unit is separated into orthogonal components, the frequency response of the identified transmission function of the measuring channel or the excitation channel for the prevailing excitation frequency is inverted, and the sine and cosine functions of the inverted phase produced are calculated, and two correction factors, with which the measured orthogonal components are corrected, are calculated using the inverted amplitude response.

The previously mentioned object is also achieved in the case of a Coriolis mass flow measuring device with at least one measuring tube through which a medium flows, at least one oscillation generator, at least one first oscillation sensor, at least one second oscillation sensor, and with at least one control and analysis unit, in such a way that a multiplexer system is provided with n+r inputs and m outputs, n primary signals can go to n inputs of the multiplexer system, r reference signals can go to r inputs of the multiplexer system, whereby m>1, n>1, and r>1 applies, and the m outputs of the multiplexer system can be connected directly or indirectly via filter systems with inputs of the control and analysis unit, so that at least two switchable measuring channels are created via the multiplexer system, whereby the control and analysis unit is set up quite specifically so that the above-described method is implemented during operation.

This arrangement makes it possible to switch n primary measuring signals and r reference signals alternately to m outputs of the multiplexer system, whereby a primary measuring signal or a reference signal can be simultaneously put through to different outputs of the multiplexer system, in such a way that the primary measuring signal or the reference signal is transmitted via more than one measuring channel. In this case, the same primary measuring signals transmitted via different measuring channels are subject to the same unavoidable interference of the measuring channels in question, i.e., for example, common-mode interference as well as balanced interference of the measuring channels.

By the additional steps of the method according to the invention for operating a Coriolis mass flow measuring device—mean value formation of the different values obtained for the transmitted primary measuring signals and subtraction of the mean values of the different primary measuring signals—the desired derived secondary variable, especially the mass flow, can be determined regardless of interference of the measuring channels. The multiplexing of the measuring and drive channels makes possible both the adjustment of the measuring channels and the excitation channels to one another as well as the interference-free determination of the secondary variables. The adjustment of the channels is defined as the channels being influenced in such a way that they exhibit the same transmission behavior, i.e., result in the same measuring values, regardless of whether, viewed in absolute terms, a measurement error—identical because of the adjustment—exists. These measurement errors no longer have an effect in any case when the determination of the balancing values is based on a subtraction and/or a division of the values obtained from the different adjusted measuring channels.

The above-described method is preferably used in connection with Coriolis mass flow measuring devices, which have at least three measuring channels. Then, two measuring channels are always available for the actual measurement, while the measuring channel that remains in each case can be identified. The redundancy thus obtained is in particular also advantageous for meeting SIL safety requirement stages.

In detail, there are now different possibilities for configuring and further developing the method for operating a Coriolis mass flow measuring device and the Coriolis mass flow measuring device according to the invention. To this end, reference is made to the following description of preferred embodiments in connection with the accompanying drawings.

DETAILED DESCRIPTION OF THE INVENTION

Figure 1:
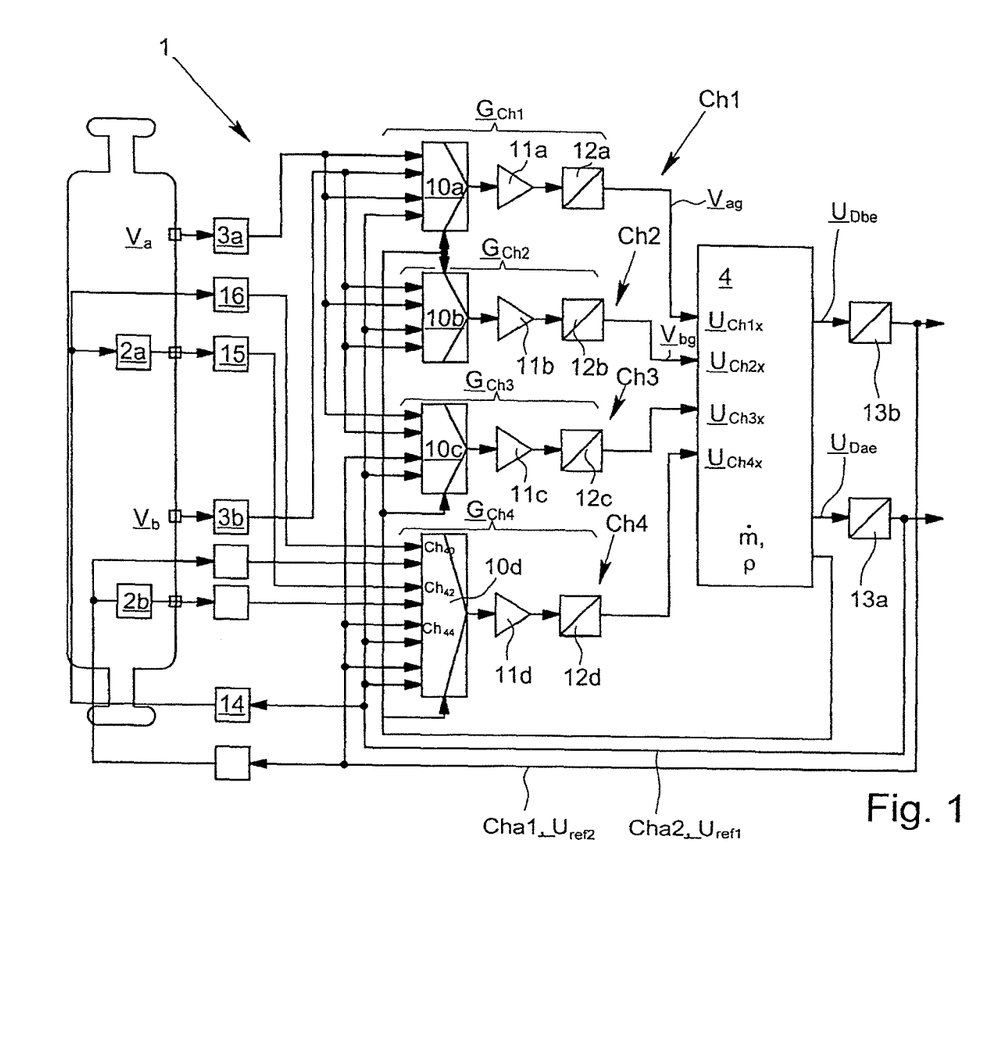
FIG. 1 is a diagrammatic representation of a Coriolis mass flow measuring device according to the invention for explaining the method for operating a Coriolis mass flow measuring device according to the invention.
Figure 2:
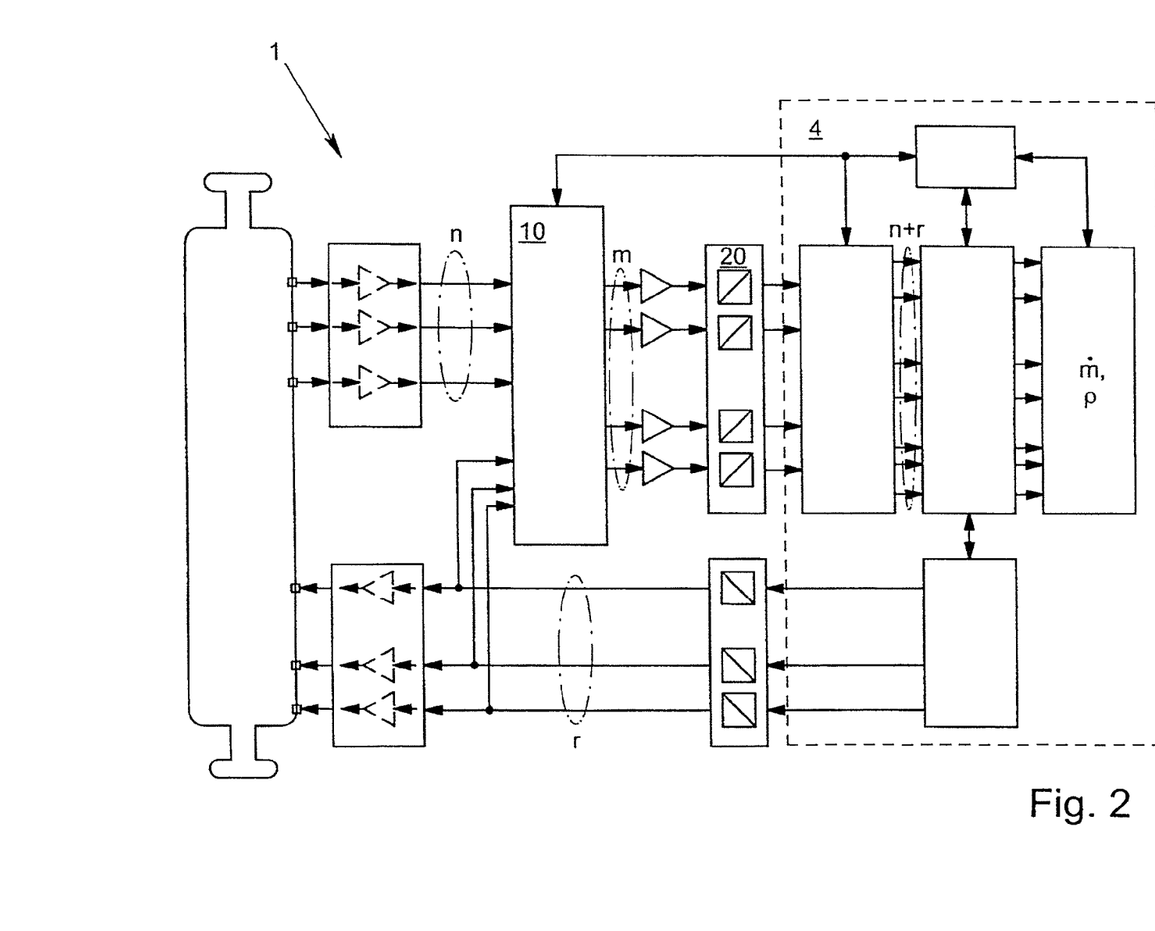
FIG. 2 is another diagrammatic representation of a Coriolis mass flow measuring device according to the invention.

In FIGS. 1 and 2, a Coriolis mass flow measuring device 1, which—has a measuring tube (not shown) through which a medium flows and a pair of oscillation generators 2a, 2b as well as a first oscillation sensor 3a and a second oscillation sensor 3b (FIG. 1), is first shown in a very diagrammatic form. The oscillation generators 2a, 2b are formed, for example, by current-carrying coils with a permanent magnet, in such a way that when the coils are supplied with a current, a force is exerted on the measuring tube. Also, the Coriolis mass flow measuring device 1 has a control and analysis unit 4, whereby excitation signals $\underline{U}_{Dae}$, $\underline{U}_{Dbe}$, are generated which, in each case, are routed via an excitation channel Cha1, Cha2 to the respective oscillation generator 2a, 2b. Furthermore, the control and analysis unit 4 receives a first primary measuring signal $\underline{V}_a$ of interest via a first measuring channel Ch1 from the first oscillation sensor 3a, and the control and analysis unit 4 also receives a second primary measuring signal $\underline{V}_b$ of interest via at least one second measuring channel Ch2 from the second oscillation sensor 3b. The primary measuring signals $\underline{V}_a$, $\underline{V}_b$ of interest here are velocity signals of the measuring tube movement acquired by the oscillation sensors 3a, 3b.

The components of the Coriolis mass flow measuring device 1 depicted in FIG. 1 are operated, here, in such a way that the control and analysis device 4 ratiometrically calculates a derived secondary variable in the form of the mass flow $\dot{m}$ indirectly from the primary measuring signals $\underline{V}_{ag}$, $\underline{V}_{bg}$ transmitted via the measuring channels Ch1, Ch2, whereby the primary measuring signals $\underline{V}_a$, $\underline{V}_b$ of interest are routed alternately via the different measuring channels Ch1, Ch2 to the control and analysis unit 4. Balancing values $\underline{V}_{am}$, $\underline{V}_{bm}$ of the transmitted primary measuring signals $\underline{V}_{ag}$, $\underline{V}_{bg}$ are then calculated from the different values $\underline{V}_{ag1}$, $\underline{V}_{ag2}$ and $\underline{V}_{bg1}$, $\underline{V}_{bg2}$ for the transmitted primary measuring signals $\underline{V}_{ag}$, $\underline{V}_{bg}$ that are obtained via the different measuring channels Ch1, Ch2. Here, $\underline{V}_{agn}$ refers to the value of the primary measuring signal $\underline{V}_a$ of interest that is obtained and measured via the measuring channel Chn. The calculated balancing values $\underline{V}_{am}$ and $\underline{V}_{bm}$ are then taken as a basis for the calculation of the derived secondary variable—here the mass flow $\dot{m}$.

In this case, the control and analysis unit 4 is a digital signal processor (DSP), in which various signal-processing functional units are integrated in one component. Of course, a discrete hardware design can also be selected, but that is not the point of this invention.

The problem of the transmission behavior of the measuring channels Ch1, Ch2 that changes over the short term, intermediate term and/or long term for measuring accuracy becomes clear when the measurement section is considered in terms of equations. The change in the transmission behavior of the measuring channels can be substantiated, for example, in a temperature dependency, by ageing processes of the components that are used, or by a frequency dependency of the transmission behavior.

In the embodiment depicted in FIG. 1, the velocity of the measuring tube is ascertained at positions a and b via the oscillation sensors 3a, 3b in the form of two electromagnetic sensors and by means of measuring channels Ch1 and Ch2 with the transmission functions $\underline{G}_{Ch1}$ and $\underline{G}_{Ch2}$. The oscillation sensors 3a, 3b convert the acquired movement—primary measuring signals $\underline{V}_a$, $\underline{V}_b$ of, interest—into corresponding voltages $\underline{U}_{Va}$, $\underline{U}_{Vb}$. The conditional equations for the measuring sections accordingly read as follows:

$$\left. \begin{array}{l} \underline{U}_{Va}(j\omega) = \underline{G}_{Va}(j\omega) \cdot \underline{V}_a(j\omega) \\ \underline{V}_{ag}(j\omega) = \underline{G}_{Ch1}(j\omega) \cdot \underline{U}_{Va}(j\omega) \end{array} \right\} \Rightarrow \underline{V}_a(j\omega) = \frac{\underline{V}_{ag}(j\omega)}{\underline{G}_{Va}(j\omega) \cdot \underline{G}_{Ch1}(j\omega)} \quad \text{Eq. 1}$$

$$\left. \begin{array}{l} \underline{U}_{Vb}(j\omega) = \underline{G}_{Vb}(j\omega) \cdot \underline{V}_b(j\omega) \\ \underline{V}_{bg}(j\omega) = \underline{G}_{Ch2}(j\omega) \cdot \underline{U}_{Vb}(j\omega) \end{array} \right\} \Rightarrow \underline{V}_b(j\omega) = \frac{\underline{V}_{bg}(j\omega)}{\underline{G}_{Vb}(j\omega) \cdot \underline{G}_{Ch2}(j\omega)}$$

Hereinafter:

$\underline{G}_{Va,b}$ means transmission functions of the oscillation sensors 3a, 3b in the form of velocity sensors at the measuring tube positions a and b, $\underline{G}_{Ch1,2}$ means transmission functions of the measuring channels Ch1 and Ch2, $\underline{V}_{a,b}$ means complex velocity of the measuring tube at positions a and b, $\underline{U}_{Va,Vb}$ means complex voltages of the oscillation sensors 3a, 3b, $\underline{V}_{ag,bg}$ means complex values of the velocities $V_a$, $V_b$ of the measuring tube measured via the measuring channels, and ω means the angular frequency of the excitation.

In this case, the measuring tube is excited at a frequency that corresponds to the natural resonance circuit frequency of the first eigen form of the measuring tube. When flow occurs through the measuring tube, an oscillation of the measuring tube in the second eigen form then sets in automatically, whereby the intake-side oscillation and the discharge-side oscillation of the measuring tube are phase-shifted with respect to one another as a function of the mass flow, and the phase shift and/or the delay between the oscillations ascertained on the intake side and the discharge side represent a direct measurement of the mass flow. The phase difference between the intake-side and the discharge-side oscillations of the measuring tube can be represented as the difference of these complex-value variables in the case of complex velocities $\underline{V}_a$, $\underline{V}_b$. Overall, in this case, the mass flow is calculated ratiometrically by the following relationship:

$$\dot{m} = f\left(\frac{\underline{V}_a(j\omega) - \underline{V}_b(j\omega)}{\underline{V}_a(j\omega) + \underline{V}_b(j\omega)}\right) = f\left(\frac{\underline{V}_2(j\omega)}{\underline{V}_1(j\omega)}\right) \quad \text{Eq. 2}$$

In this connection, $\underline{V}_1$ is the velocity of the first eigen form, and $\underline{V}_2$ is the velocity of the second eigen form of the measuring tube oscillation. The calculation is therefore ratiometric, since the difference of the primary measuring signals of interest is divided by the sum of the primary measuring signals of interest, which experience the same influences when transmitted via the measuring channels Ch1, Ch2.

Quite specifically, the function for determining the mass flow can be implemented as follows, but that is not the point in detail:

$$\dot{m} = \text{Re}\left\{\frac{\underline{V}_2}{\underline{V}_1} \cdot \frac{1}{k_{CN} \cdot \underline{G}_2} - \frac{K}{k_{CN}}\right\}$$

$$\dot{m} = \text{Re}\left\{\frac{\text{Re}\{\underline{V}_2\} + j\text{Im}\{\underline{V}_2\}}{\text{Re}\{\underline{V}_1\} + j\text{Im}\{\underline{V}_1\}} \cdot \frac{1}{k_{CN} \cdot j \cdot \text{Im}\{\underline{G}_2\}}\right\} - \frac{k_v}{k_{CN}}$$

$$\dot{m} = \frac{\text{Im}\{\underline{V}_2\} \cdot \text{Re}\{\underline{V}_1\} - \text{Re}\{\underline{V}_2\} \cdot \text{Im}\{\underline{V}_1\}}{\text{Re}\{\underline{V}_1\}^2 + \text{Im}\{\underline{V}_1\}^2} \cdot \frac{1}{k_{CN} \cdot \text{Im}\{\underline{G}_2\}} - \frac{k_v}{k_{CN}}$$

with $\underline{V}_1 = \underline{V}_a + \underline{V}_b$ Velocity of the first eigen form,
$\underline{V}_2 = \underline{V}_a - \underline{V}_b$ Velocity of the second eigen form,
Re, Im Real or imaginary part,
$k_{CN}$ Coriolis coefficient in normal mode,
$\underline{G}_2$ Transmission function of the second eigen form of the measuring tube, and
$k_v$ Coefficient of the velocity-proportional coupling of the measuring-tube halves.

Below, the complex argument jω is omitted to increase clarity. The view first advanced depicts the measurement for the case where each of the two velocity signals is determined via always the same two independent measuring channels, as is also known from the state of the art; this is the first thing that makes the problem underlying the invention clear.

First, in Eq. 2, the primary measuring signals $\underline{V}_a$, $\underline{V}_b$ of interest—the actual measuring tube velocities at positions a and b of the measuring tube—are replaced by the measured variables $\underline{V}_{ag}$ and $\underline{V}_{bg}$; it results in:

$$\frac{\underline{V}_a - \underline{V}_b}{\underline{V}_a + \underline{V}_b} = \frac{\underline{G}_{Vb} \cdot \underline{G}_{Ch2} \cdot \underline{V}_{ag} - \underline{G}_{Va} \cdot \underline{G}_{Ch1} \cdot \underline{V}_{bg}}{\underline{G}_{Vb} \cdot \underline{G}_{Ch2} \cdot \underline{V}_{ag} + \underline{G}_{Va} \cdot \underline{G}_{Ch1} \cdot \underline{V}_{bg}} \quad \text{Eq. 3}$$

For the sake of simplicity, but without narrowing the meaning, it is assumed that the transmission functions of the two velocity sensors 3a, 3b are the same; the transmission functions thus are adjusted to one another, which can be achieved by selective selection of the oscillation sensors (coil and magnet). The following thus applies:

$$\underline{G}_{Va} = \underline{G}_{Vb} = \underline{G}_V \Rightarrow \frac{\underline{V}_a - \underline{V}_b}{\underline{V}_a + \underline{V}_b} = \frac{\underline{G}_{Ch2} \cdot \underline{V}_{ag} - \underline{G}_{Ch1} \cdot \underline{V}_{bg}}{\underline{G}_{Ch2} \cdot \underline{V}_{ag} + \underline{G}_{Ch1} \cdot \underline{V}_{bg}} \quad \text{Eq. 4}$$

When the transmission behavior of the two measuring channels Ch1, Ch2 deviates from one another by $\Delta\underline{G}_{Ch}$, then the following also applies:

$$\underline{G}_{Ch1} = \underline{G}_{Ch} + \Delta\underline{G}_{Ch}; \quad \underline{G}_{Ch2} = \underline{G}_{Ch} - \Delta\underline{G}_{Ch}$$

$$\underline{G}_{Ch} = \frac{\underline{G}_{Ch1} + \underline{G}_{Ch2}}{2}; \quad \Delta\underline{G}_{Ch} = \frac{\underline{G}_{Ch1} - \underline{G}_{Ch2}}{2}$$

By using this relationship in Eq. 4, the following results:

$$\frac{\underline{V}_a - \underline{V}_b}{\underline{V}_a + \underline{V}_b} = \frac{\underline{G}_{Ch} \cdot (\underline{V}_{ag} - \underline{V}_{bg}) - \Delta\underline{G}_{Ch} \cdot (\underline{V}_{ag} + \underline{V}_{bg})}{\underline{G}_{Ch} \cdot (\underline{V}_{ag} + \underline{V}_{bg}) - \Delta\underline{G}_{Ch} \cdot (\underline{V}_{ag} - \underline{V}_{bg})} \quad \text{Eq. 5}$$

Since the deviation of the transmission functions of the measuring channels is less than the identical parts of the transmission function $\underline{G}_{Ch}$ of the measuring channels, the following applies:

$$\underline{G}_{Ch} \cdot (\underline{V}_{ag} + \underline{V}_{bg}) \gg \Delta\underline{G}_{Ch} \cdot (\underline{V}_{ag} - \underline{V}_{bg}) \quad \text{Eq. 6}$$

whereby Eq. 5 can be described approximately with:

$$\frac{\underline{V}_a - \underline{V}_b}{\underline{V}_a + \underline{V}_b} \approx \frac{(\underline{V}_{ag} - \underline{V}_{bg})}{(\underline{V}_{ag} + \underline{V}_{bg})} - \frac{\Delta\underline{G}_{Ch}}{\underline{G}_{Ch}} \quad \text{Eq. 7}$$

From the above-mentioned approach, it follows that the accuracy of the measurement depends directly on the relative deviation of the transmission behavior of the measuring channels, whereby according to experience, the following applies $$\frac{\Delta\underline{G}_{Ch}}{\underline{G}_{Ch}} \approx 10^{-4} \ldots 10^{-2},$$

so that the above-mentioned desired accuracy cannot be readily created. This problem is solved by the method that is described according to the invention and below. The basic idea is first to acquire the primary measuring signals $\underline{V}_a$, $\underline{V}_b$ of interest via independent measuring channels Ch1, Ch2.

In the embodiment depicted in FIG. 1, the primary measuring signals $\underline{V}_a$, $\underline{V}_b$ of interest are measured alternately via the two measuring channels Ch1, Ch2 to eliminate the influences of the measuring channels Ch1, Ch2 on the measurement, so that for a predefined time, the velocity signal $\underline{V}_a$ is measured via the measuring channel Ch1 and then via the measuring channel Ch2. The procedure is exactly the same with the velocity signal $\underline{V}_b$, whereby preferably the measuring periods of the two measuring channels Ch1, Ch2 are selected to be identical. The thus obtained different values $\underline{V}_{ag1}$, $\underline{V}_{ag2}$ are then used to calculate a balancing value $\underline{V}_{am}$, here namely by forming the arithmetic mean value. For the first primary measuring signal of interest, i.e., the velocity signal $\underline{V}_a$, the measuring equations (Eq. 8) then read:

$$\left. \begin{array}{l} \underline{U}_{Va1} = \underline{G}_{Va} \cdot \underline{V}_{a1} \\ \underline{V}_{ag1} = \underline{G}_{Ch1} \cdot \underline{U}_{Va1} \\ \underline{U}_{Va2} = \underline{G}_{Va} \cdot \underline{V}_{a2} \\ \underline{V}_{ag2} = \underline{G}_{Ch2} \cdot \underline{U}_{Va2} \end{array} \right\} \Rightarrow \left\{ \begin{array}{l} \underline{V}_{a1} = \dfrac{\underline{V}_{ag1}}{\underline{G}_{Ch1} \cdot \underline{G}_{Va}} \\ \underline{V}_{a2} = \dfrac{\underline{V}_{ag2}}{\underline{G}_{Ch2} \cdot \underline{G}_{Va}} \end{array} \right. \quad \text{Eq. 8}$$

$$\Rightarrow \underline{V}_{am} = \frac{\underline{V}_{a1} + \underline{V}_{a2}}{2} = \frac{\underline{V}_{ag1} \cdot \underline{G}_{Ch2} + \underline{V}_{ag2} \cdot \underline{G}_{Ch1}}{2\underline{G}_{Ch1} \cdot \underline{G}_{Ch2} \cdot \underline{G}_{Va}}$$

The same is true for the second primary measuring signal of interest, i.e., the velocity signal $\underline{V}_b$ of Eq. 9:

$$\left. \begin{array}{l} \underline{U}_{Vb1} = \underline{G}_{Vb} \cdot \underline{V}_{b1} \\ \underline{V}_{bg1} = \underline{G}_{Ch1} \cdot \underline{U}_{Vb1} \\ \underline{U}_{Vb2} = \underline{G}_{Vb} \cdot \underline{V}_{b2} \\ \underline{V}_{bg2} = \underline{G}_{Ch2} \cdot \underline{U}_{Vb2} \end{array} \right\} \Rightarrow \left\{ \begin{array}{l} \underline{V}_{b1} = \dfrac{\underline{V}_{bg1}}{\underline{G}_{Ch1} \cdot \underline{G}_{Va}} \\ \underline{V}_{b2} = \dfrac{\underline{V}_{bg2}}{\underline{G}_{Ch2} \cdot \underline{G}_{Va}} \end{array} \right. \quad \text{Eq. 9}$$

$$\Rightarrow \underline{V}_{bm} = \frac{\underline{V}_{b1} + \underline{V}_{b2}}{2} = \frac{\underline{V}_{bg1} \cdot \underline{G}_{Ch2} + \underline{V}_{bg2} \cdot \underline{G}_{Ch1}}{2\underline{G}_{Ch1} \cdot \underline{G}_{Ch2} \cdot \underline{G}_{Vb}}$$

If the mass flow according to Eq. 2 is now calculated with these balancing values $\underline{V}_{am}$, $\underline{V}_{bm}$, the following results:

$$\frac{\underline{V}_{am} - \underline{V}_{bm}}{\underline{V}_{am} + \underline{V}_{bm}} = \frac{\dfrac{\underline{V}_{ag1} \cdot \underline{G}_{Ch2} + \underline{V}_{ag2} \cdot \underline{G}_{Ch1}}{2\underline{G}_{Ch1} \cdot \underline{G}_{Ch2} \cdot \underline{G}_{Va}} - \dfrac{\underline{V}_{bg1} \cdot \underline{G}_{Ch2} + \underline{V}_{bg2} \cdot \underline{G}_{Ch1}}{2\underline{G}_{Ch1} \cdot \underline{G}_{Ch2} \cdot \underline{G}_{Vb}}}{\dfrac{\underline{V}_{ag1} \cdot \underline{G}_{Ch2} + \underline{V}_{ag2} \cdot \underline{G}_{Ch1}}{2\underline{G}_{Ch1} \cdot \underline{G}_{Ch2} \cdot \underline{G}_{Va}} + \dfrac{\underline{V}_{bg1} \cdot \underline{G}_{Ch2} + \underline{V}_{bg2} \cdot \underline{G}_{Ch1}}{2\underline{G}_{Ch1} \cdot \underline{G}_{Ch2} \cdot \underline{G}_{Vb}}}$$

After several transformations, the following finally results:

$$\frac{\underline{V}_{am} - \underline{V}_{bm}}{\underline{V}_{am} + \underline{V}_{bm}} = \frac{\underline{V}_{ag1} \cdot \underline{G}_{Ch2} \cdot \underline{G}_{Vb} + \underline{V}_{ag2} \cdot \underline{G}_{Ch1} \cdot \underline{G}_{Vb} - \underline{V}_{bg1} \cdot \underline{G}_{Ch2} \cdot \underline{G}_{Va} - \underline{V}_{bg2} \cdot \underline{G}_{Ch1} \cdot \underline{G}_{Va}}{\underline{V}_{ag1} \cdot \underline{G}_{Ch2} \cdot \underline{G}_{Vb} + \underline{V}_{ag2} \cdot \underline{G}_{Ch1} \cdot \underline{G}_{Vb} + \underline{V}_{bg1} \cdot \underline{G}_{Ch2} \cdot \underline{G}_{Va} + \underline{V}_{bg2} \cdot \underline{G}_{Ch1} \cdot \underline{G}_{Va}}$$

When, in turn, it is assumed that the transmission functions of the two oscillation sensors 3a, 3b are adjusted to one another by selective selection of the sensor elements (coils and magnets), i.e., are the same, the following results:

$$\underline{G}_{Va} = \underline{G}_{Vb} \Rightarrow \frac{\underline{V}_{am} - \underline{V}_{bm}}{\underline{V}_{am} + \underline{V}_{bm}} = \frac{\underline{V}_{ag1} \cdot \underline{G}_{Ch2} + \underline{V}_{ag2} \cdot \underline{G}_{Ch1} - \underline{V}_{bg1} \cdot \underline{G}_{Ch2} - \underline{V}_{bg2} \cdot \underline{G}_{Ch1}}{\underline{V}_{ag1} \cdot \underline{G}_{Ch2} + \underline{V}_{ag2} \cdot \underline{G}_{Ch1} + \underline{V}_{bg1} \cdot \underline{G}_{Ch2} + \underline{V}_{bg2} \cdot \underline{G}_{Ch1}} \quad \text{Eq. 10}$$

Because of this possibility of simplicity, the first oscillation sensor 3a and the second oscillation sensor 3b are embodied in the depicted embodiment in such a way that they have identical mechanical and electrical transmission behavior so that the adjustment has been carried out by selection.

From the relationships $$\left. \begin{array}{l} \underline{V}_{ag} = \dfrac{\underline{V}_{ag1} + \underline{V}_{ag2}}{2} \\ \Delta\underline{V}_{ag} = \dfrac{\underline{V}_{ag1} - \underline{V}_{ag2}}{2} \end{array} \right\} \Rightarrow \left\{ \begin{array}{l} \underline{V}_{ag1} = \underline{V}_{ag} + \Delta\underline{V}_{ag} \\ \underline{V}_{ag2} = \underline{V}_{ag} - \Delta\underline{V}_{ag} \end{array} \right. \quad \text{Eq. 11}$$

$$\left. \begin{array}{l} \underline{V}_{bg} = \dfrac{\underline{V}_{bg1} + \underline{V}_{bg2}}{2} \\ \Delta\underline{V}_{bg} = \dfrac{\underline{V}_{bg1} - \underline{V}_{bg2}}{2} \end{array} \right\} \Rightarrow \left\{ \begin{array}{l} \underline{V}_{bg1} = \underline{V}_{bg} + \Delta\underline{V}_{bg} \\ \underline{V}_{bg2} = \underline{V}_{bg} - \Delta\underline{V}_{bg} \end{array} \right. \quad \text{Eq. 12}$$

$$\left. \begin{array}{l} \underline{G}_{Ch} = \dfrac{\underline{G}_{Ch1} + \underline{G}_{Ch2}}{2} \\ \Delta\underline{G}_{Ch} = \dfrac{\underline{G}_{Ch1} - \underline{G}_{Ch2}}{2} \end{array} \right\} \Rightarrow \left\{ \begin{array}{l} \underline{G}_{Ch1} = \underline{G}_{Ch} + \Delta\underline{G}_{Ch} \\ \underline{G}_{Ch2} = \underline{G}_{Ch} - \Delta\underline{G}_{Ch} \end{array} \right. \quad \text{Eq. 13}$$

the following is produced from Eq. 10:

$$\frac{\underline{V}_{am} - \underline{V}_{bm}}{\underline{V}_{am} + \underline{V}_{bm}} = \frac{\underline{V}_{ag}\underline{G}_{Ch} - \Delta\underline{V}_{ag}\Delta\underline{G}_{Ch} - \underline{V}_{bg}\underline{G}_{Ch} + \Delta\underline{V}_{bg}\Delta\underline{G}_{Ch}}{\underline{V}_{ag}\underline{G}_{Ch} - \Delta\underline{V}_{ag}\Delta\underline{G}_{Ch} + \underline{V}_{bg}\underline{G}_{Ch} - \Delta\underline{V}_{bg}\Delta\underline{G}_{Ch}} \quad \text{Eq. 14}$$

Since the common part $\underline{G}_{Ch}$ of the transmission functions of the measuring channels Ch1, Ch2 is larger than the deviations of the transmission functions $\Delta\underline{G}_{Ch}$ of the measuring channels, the following applies:

$$V_{ag}G_{Ch}V_{bg}G_{Ch} \gg \Delta V_{ag}\Delta G_{Ch}\Delta V_{bg}\Delta G_{Ch}$$

Taking into consideration this relationship, the following therefore results from Eq. 14:

$$\frac{V_{am} - V_{bm}}{V_{am} + V_{bm}} = \frac{V_{ag} - V_{bg}}{V_{ag} + V_{bg}} - \frac{\Delta V_{ag} - \Delta V_{bg}}{V_{ag} + V_{bg}} \cdot \frac{\Delta G_{Ch}}{G_{Ch}} \quad \text{Eq. 15}$$

The comparison of the result for the alternating use of measuring channels (Eq. 15) with the result of strict use of only one measuring channel for a primary measuring signal of interest shows that the error is considerably reduced by deviating measuring channel transmission functions, is namely reduced by the factor:

$$\frac{\Delta V_{ag} - \Delta V_{bg}}{V_{ag} + V_{bg}}$$

When the changes in the velocity signals during the two alternating measuring periods 1 and 2 are the same or the changes are actually only very small, i.e., when $\Delta\underline{V}_{ag} \approx \Delta\underline{V}_{bg}$ holds true, then a mass flow measurement results that is completely independent of the transmission behavior of the measuring channels:

$$\frac{\underline{V}_{am} - \underline{V}_{bm}}{\underline{V}_{am} + \underline{V}_{bm}} = \frac{\underline{V}_{ag} - \underline{V}_{bg}}{\underline{V}_{ag} + \underline{V}_{bg}} \qquad \text{Eq. 16}$$

so that the mass flow based on measurement variables corresponds virtually to the mass flow, which was determined with use of primary measuring signals $\underline{V}_a$, $\underline{V}_b$ that are not influenced by the measuring channels and that are of interest; the following then applies:

$$\dot{m} = f\left(\frac{\underline{V}_a - \underline{V}_b}{\underline{V}_a + \underline{V}_b}\right) = f\left(\frac{\underline{V}_{ag} - \underline{V}_{bg}}{\underline{V}_{ag} + \underline{V}_{bg}}\right)$$

The switch-over of the measuring channels is carried out in FIG. 1 as well as in FIG. 2 by multiplexer systems 10, which allow for directing the primary measuring signals $\underline{V}_a$, $\underline{V}_b$ of interest via the different measuring channels Ch1, Ch2. In the embodiment according to FIG. 1, the multiplexer system 10 is formed patnitof several separate multiplexers 10a, 10b, 10c, 10d.

In the case of the embodiments with multiplexers depicted in FIGS. 1 and 2, the measuring periods are provided by the respective multiplexer cycle and are selected in this case in the millisecond range. It is thus ensured that the transient response time of the multiplexer channels is allowed to elapse and that the measurements are not distorted by the dynamic switching properties of the multiplexer channels. In this case, the waiting period is implemented in such a way that directly after the switch-over, a predetermined number of scanned measured values are not taken into consideration.

Eq. 15 indicates that a measurement uncertainty can develop when the dynamics of the primary measuring signals of interest in the form of velocity signals is large due to process during the two alternating measuring periods (see second term in the conditional equation 15). Also, to be able to counteract such a dynamic change, provision is further made for identifying the transmission functions $\underline{G}_{Ch1}$, $\underline{G}_{Ch2}$ of the measuring channels Ch1, Ch2, namely by the measuring channels Ch1, Ch2 being exposed directly to at least one known reference signal $\underline{U}_{ref1}$, $U_{ref2}$, and the measuring channel response signals $\underline{U}_{Ch1}$, $\underline{U}_{Ch2}$ of the exposed measuring channels Ch1, Ch2 being ascertained, and the transmission functions of the measuring channels being identified based on the known measuring reference signals $\underline{U}_{ref1}$, $\underline{U}_{ref2}$ and based on the acquired measuring channel response signals $\underline{U}_{Ch1}$, $\underline{U}_{Ch2}$. The identification of the transmission functions $\underline{G}_{Ch1}$, $\underline{G}_{Ch2}$ of the measuring channels Ch1, Ch2 then makes it possible to correct the actual transmission behavior of the measuring channels. In the depicted embodiments, the procedure is performed in a like manner with the transmission function of the excitation channels. The reference signals $\underline{U}_{ref1}$, $\underline{U}_{ref2}$ are therefore known, since they are generated and output by the control and analysis unit 4.

As reference signals $\underline{U}_{ref1}$, $\underline{U}_{ref2}$, for example, the prevailing drive signal or the drive signals can be used, which has/have virtually the same steady frequency and amplitude. The information obtained therefrom can be sufficient for identification when enough knowledge on the transmission behavior of the channels exists beforehand.

The identification of the transmission behavior of the measuring channels Ch1, Ch2 and the transmission function of the excitation channels Cha1, Cha2 takes place here by excitation of the measuring channels or the excitation channels with a sinusoidal reference signal with variation of frequency and amplitude, so that the frequency responses of the measuring channels Ch1, Ch2 and the excitation channels Cha1, Cha2 can be determined.

The identification and the correction of a measuring channel are explained below in the example of the measuring channel Ch1. In the identification, the following transmission function $\underline{G}_{Ch1}$ of the measuring channel Ch1 with the frequency f as a parameter is taken as a basis:

$$\underline{G}_{Ch1,ident}(f) = \frac{\underline{U}_{Ch1}(f)}{\underline{U}_{ref1}(f)} = A_{Ch1}(f) \cdot e^{j\varphi_{Ch1}(f)}$$

In this case, with reference to FIG. 1, the transmission function $\underline{G}_{Ch1}$ of the measuring channel Ch1 consists of the partial transmission functions of the multiplexer 10a, a measuring amplifier 11a and an A/D-converter 12a. $\underline{U}_{ref1}$ is the reference voltage at the output of a D/A converter 13a and is assumed to be known, so that the uncertainties of the transmission function of the D/A converter remain in the absolute identification of the drive and measuring channels; they are, however, ineffective toward one another in the adjustment of drive and measuring channels.

Figure 3A:
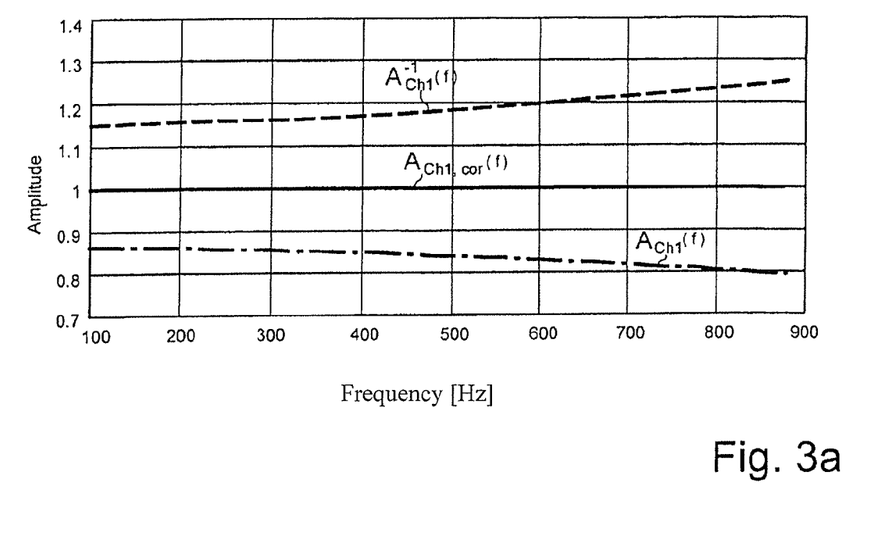
FIGS. 3a & 3b are graphs showing the amplitude response as a function of frequency and the phase response as a function of frequency of an identified measuring channel, for a correction element, and a measuring channel.
Figure 3B:
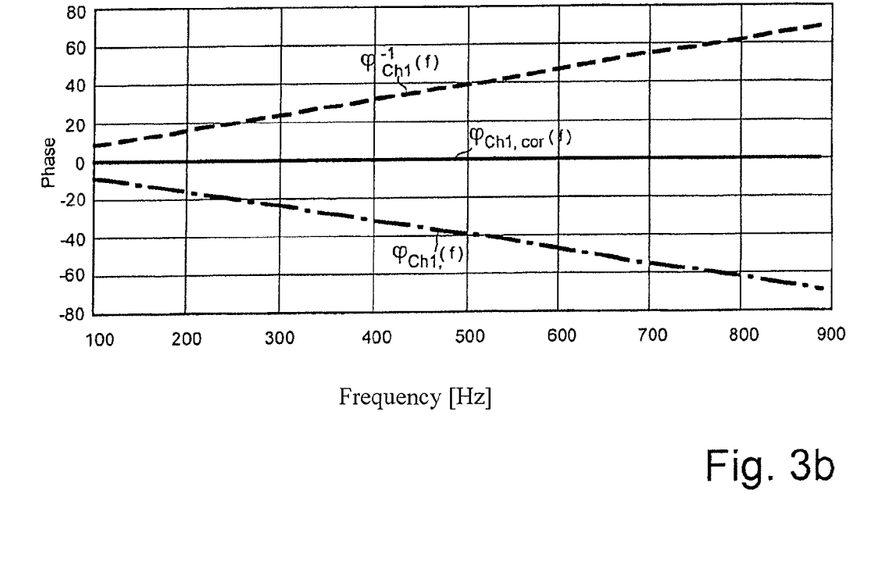

In FIG. 3a, the measured amplitude response $A_{Ch1}(f)$, the corrector amplitude response $A^{-1}_{Ch1}(f)$ and the corrected amplitude response $A_{Ch1,cor}(f)$ of the measuring channel Ch1 are depicted, and in FIG. 3b, the measured phase response $\phi_{Ch1}(f)$, the corrector phase response $\phi^{-1}_{Ch1}(f)$ and the corrected phase response $\phi_{Ch1,cor}(f)$ of the measuring channel Ch1 are depicted. It is readily evident that owing to the correction that is performed, the transmission behavior of the measuring channel Ch1 has been virtually neutralized; the measuring channel leads neither to a change of the measuring signal in terms of amount nor to a change in the phase of the measuring signal.

Figure 4:
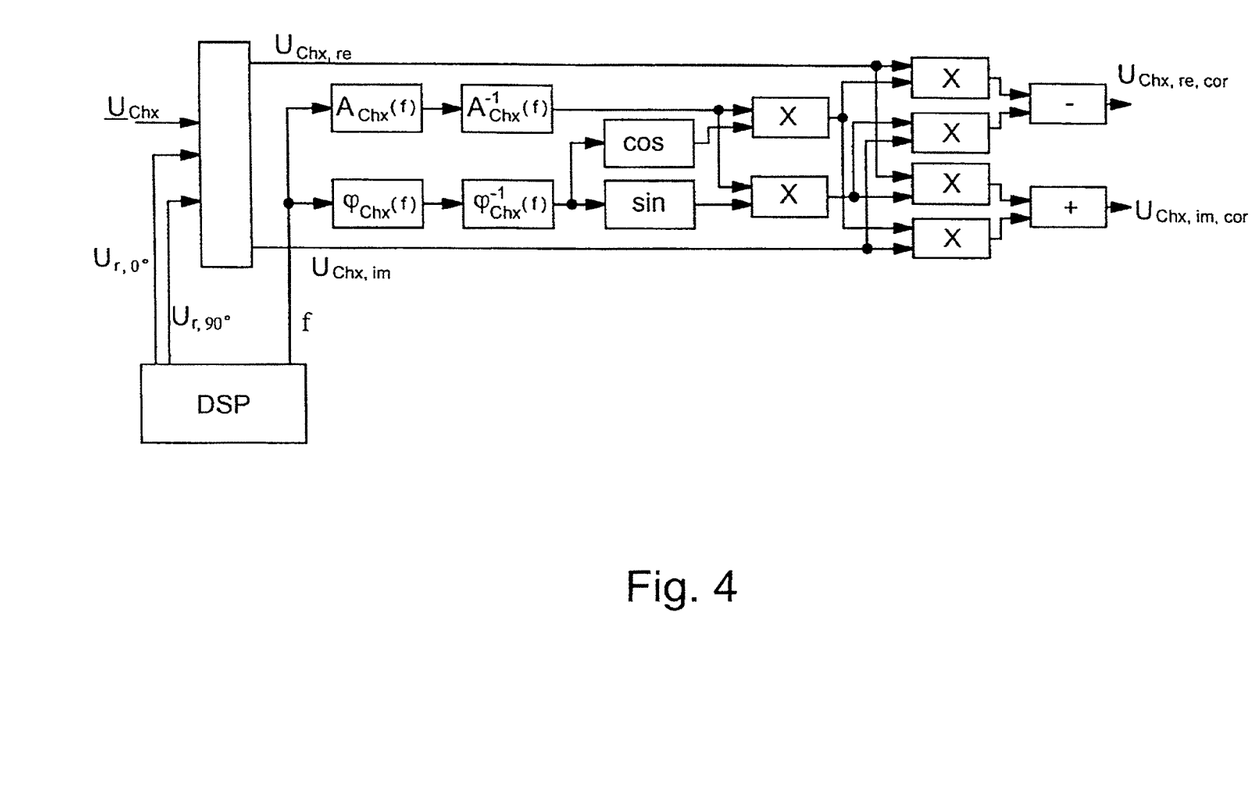
FIG. 4 is a block diagram for explaining correction of the transmission behavior of a measuring channel in the frequency range.

In the depicted embodiments, the correction is made in the frequency range and is pointed out diagrammatically in FIG. 4 based on a block diagram. In block $A_{Chx}(f)$, the amplitude response of the measuring channel Chx is stored as an analytical function, here as a polynomial of the third order in the frequency. In the case of other embodiments, the amplitude response of the measuring channel Ch1 is stored as a table. In block $\phi_{Chx}(f)$, the phase response of the measuring channel Chx is laid down in a corresponding manner.

In the subsequent blocks, the frequency response for the prevailing excitation frequency is inverted $A^{-1}_{Chx}(f), \phi^{-1}_{Chx}(f)$, and the cosine and sine functions of the phase that is produced from the inversion are formed. Two correction factors, in each case one for the real part and one for the imaginary part, are calculated therefrom using the inverted amplitude response, and the prevailing measured real part $U_{Chx,re}$ and the prevailing measured imaginary part $U_{Chx,im}$ of the measuring channel Chx are corrected with the latter. The correction and/or the adjustment can be done in a corresponding manner for all excitation channels and measuring channels.

In this case, the amplitude response is described by the following polynomial:

$$A_{Chx}(f) = -1.1091 \times 10^{-7}/\text{Hz}^2 \cdot f^2 + 2.6444 \times 10^{-6}/\text{Hz} \cdot f + 0.08671.$$

The corrected amplitude is produced at a specific frequency f from the quotient from the measured amplitude and $A_{Chx}(f)$.

Also, in this case, the phase response is described by the following polynomial:

$$\phi_{Chx}(f) = 5.2519\ \text{rad/Hz}^2 * 10^{-9} * f^2 - 0.0014\ \text{rad/Hz} * f + 1.0661 * 10^{-4}\ \text{rad},$$

whereby the corrected phase is produced from the difference of the measured phase and $\phi_{Chx}(f)$.

The identification and the correction and/or the adjustment of the excitation channels Cha1, Cha2 are explained below by way of example of the excitation channel Cha2. The excitation channel Cha2 consists of the following transmission functions (FIG. 1):

$\underline{G}_{Da}$ Transmission function of the D/A-converter 13a,
$\underline{G}_{La}$ Transmission function of a power amplifier 14,
$\underline{G}_{uia}$ Transmission function of the drive coil 2a,
$\underline{G}_{ia}$ Transmission function of a measuring resistor 15 for the drive current, and
$\underline{G}_{ua}$ Transmission function of a voltage splitter 16 for measuring the voltage on the drive coil.

It is assumed that the current through the drive coil 2a is measured via the voltage drop on a precision resistor 15, so that the transmission function $\underline{G}_{ia}$ can be described as a P-element, whose proportionality factor is known. This means: $\underline{G}_{ia}(f) = K_{ia}$.

Moreover, it is assumed that the voltage on the driver coil 2a—oscillation generator 2a—is measured via a precision voltage splitter 16, whose transmission function $\underline{G}_{ua}$ also exhibits P-behavior and whose amplification factor is known. Accordingly, the following applies: $\underline{G}_{ua}(f) = K_{ua}$.

The identification of the excitation channel Gha2 is thus simplified to the identification of the transmission functions $\underline{G}_{La}$ and $\underline{G}_{uib}$. To determine these transmission functions, the following relationships can be drawn up according to FIG. 1:

$$\underline{U}_{Dae1}(f) \cdot \underline{G}_{Da}(f) \cdot \underline{G}_{Ch4}(f) = \underline{U}_{Ch44}(f)$$

$$\underline{U}_{Dae2}(f) \cdot \underline{G}_{Da}(f) \cdot \underline{G}_{La}(f) \cdot \underline{G}_{uia}(f) \cdot \underline{G}_{ia}(f) \cdot \underline{G}_{Ch4}(f) = \underline{U}_{Ch42}(f)$$

$$\underline{U}_{Dae3}(f) \cdot \underline{G}_{Da}(f) \cdot \underline{G}_{La}(f) \cdot \underline{G}_{ua}(f) \cdot \underline{G}_{Ch4}(f) = \underline{U}_{Ch40}(f)$$

The complex variables $\underline{U}_{Dae1}, \underline{U}_{Dae2}, \underline{U}_{Dae3}$, are the known values, generated via the control and analysis unit 4 in the form of a DSP (Digital Signal Processor), at the input of the D/A-converter 13a, and the complex variables $\underline{U}_{Ch44}, \underline{U}_{Ch42}, \underline{U}_{Ch40}$ are the complex measured and thus known values at the measuring inputs of the control and analysis unit 4. This results after several transformations of the above equations, whereby in turn the argument f has been omitted for purposes of clarity:

$$\underline{G}_{Da} \cdot \underline{G}_{Ch4} = \frac{\underline{U}_{Ch44}}{\underline{U}_{Dae1}}$$

$$\underline{G}_{La} \cdot \underline{G}_{uib} \cdot \underline{G}_{ia} = \frac{\underline{U}_{Ch42}}{\underline{U}_{Dae2}} \cdot \frac{\underline{U}_{Dae1}}{\underline{U}_{Ch44}}$$

$$\underline{G}_{La} \cdot \underline{G}_{ub} = \frac{\underline{U}_{Ch40}}{\underline{U}_{Dae3}} \cdot \frac{\underline{U}_{Dae1}}{\underline{U}_{Ch44}}$$

$$\Rightarrow \begin{cases} \underline{G}_{La} = \frac{\underline{U}_{Ch40}}{\underline{U}_{Dae3}} \cdot \frac{\underline{U}_{Dae1}}{\underline{U}_{Ch44}} \cdot \frac{1}{K_{ua}} \\ \underline{G}_{uib} = \frac{\frac{\underline{U}_{Ch42}}{\underline{U}_{Dae2}} \cdot \frac{\underline{U}_{Dae1}}{\underline{U}_{Ch44}} \cdot \frac{\underline{U}_{Dae3}}{\underline{U}_{Ch40}}}{\frac{\underline{U}_{Ch44}}{\underline{U}_{Dae1}} \cdot \frac{K_{ua}}{K_{ia}}} \end{cases}$$

Thus, the transmission function $\underline{G}_{La}$ of the power amplifier 14 and the transmission function $\underline{G}_{iub}$ of the oscillation generator 2a can be determined in the form of a drive coil.

The identification of the excitation channels Cha1, Cha2 can be performed here both before the actual measuring operation and during the use of the mass flow device 1. Here, the identification and the correction of the transmission functions of the excitation channels Cha1, Cha2 are performed before the measuring operation. During operation, in a corresponding way, only the changes of the transmission functions of the excitation channels Cha1, Cha2 are then measured and corrected in the case of discrete frequencies.

In other implementations, the changes of the excitation channels during the measuring operation are measured at discrete frequencies and predetermined parameters, for example, the resistance of the drive coils 2a, 2b, is identified. They are then compared to predetermined boundary values, and predetermined measures are introduced when going above and below boundary values. These measures include, for example, a renewed identification and correction of the excitation channels Cha1, Cha2 and/or an error message.

The ascertaining of the frequency responses of the excitation channels Cha1, Cha2 and the correction of the transmission behavior or its adjustment are carried out corresponding to the procedure explained in the case of the measuring channels Ch1, Ch2. The identification of the excitation channels Cha1, Cha2 can be carried out at different frequencies, which also do not match the excitation frequency.

The identification of the excitation channels Cha1, Cha2 uses the compensation of the influence of the excitation channels Cha1, Cha2. On the one hand, the parameters of the measuring tube can thus be determined independently of properties of the excitation channels Cha1, Cha2, and, on the other hand, preferred working points can be approached and maintained precisely. The exact setting of the working points is advantageous, for example, for the accuracy of a density measurement made with the Coriolis mass flow measuring device and for achieving a good signal-to-noise ratio in measuring the flow.

In FIG. 2, another Coriolis mass flow measuring device 1 is ultimately depicted diagrammatically for performing the previously-described method, whereby the Coriolis mass flow measuring device 1 in turn has a measuring tube through which a medium flows, an oscillation generator, a first oscillation sensor, a second oscillation sensor, and a control and analysis unit 4, and a multiplexer system 10, which has (n+r) inputs and m outputs, whereby n primary signals can go to n inputs of the multiplexer system 10 and r reference signals can go to r inputs of the multiplexer system 10, whereby m>1, n>1, and r>1 applies, and whereby the m outputs of the multiplexer system can be connected directly or indirectly via filter systems 20 with inputs of the control and analysis unit 4, and whereby the control and analysis unit 4 is set up quite specifically and programmed so that the above-explained method is implemented during operation. The use of the multiplexer system 10 makes it possible to create several measuring channels Ch1, Ch2, Chn—not depicted and explained in detail in FIG. 2 but already depicted and explained in FIG. 1—and said measuring channels are switchable based on the function of the multiplexer system 10.

In the case of the Coriolis mass flow measuring device 1 according to FIG. 1, the multiplexer system 1 is created from several separate multiplexers 10a, 10b, 10c, 10d so that for the creation of measuring channels Ch1, Ch2, Chn, on the one hand, and for the creation of excitation channels Cha1, Cha2, Chan, separate multiplexers are provided, which makes possible a clean separation among signals of various strength and various noise levels.

What is claimed is:

1. Method for operating a Coriolis mass flow measuring device having at least one measuring tube through which a medium flows, at least one oscillation generator, at least one first oscillation sensor, at least one second oscillation sensor, and at least one control and analysis unit, whereby excitation signals can be transmitted via at least one excitation channel to the oscillation generator of the control and analysis unit, comprising the steps of:

transmitting a first primary measuring signal of interest via at least one first measuring channel to the control and analysis unit from the first oscillation sensor, transmitting a second primary measuring signal of interest via at least one second measuring channel to the control and analysis unit from the second oscillation sensor, using the control and analysis unit to ratiometrically calculate at least one derived secondary variable at least indirectly from the primary measuring signals transmitted via the at least one first and at least one second measuring channels, alternately transmitting the primary measuring signals of interest via at least one first and at least one second measuring channels to the control and analysis unit, calculating comparison values of the transmitted primary measuring signals from different values for the primary measuring signals transmitted via the different measuring channels, and using the calculated comparison values as a basis for calculating the derived secondary variable.

2. Method according to claim 1, wherein the comparison values are calculated from the different values of the transmitted primary measuring signals that are obtained via the first and second measuring channels by forming arithmetic mean values.

3. Method according to claim 1, wherein a measuring period, during which a specific primary measuring signal is transmitted via a respective one of the measuring channels, lasts until transients of transmission behavior of the respective measuring channel have subsided.

4. Method according to claim 1, comprising the further step of discarding the first measurement values after switching over a measuring channel.

5. Method according to claim 1, wherein at least one measuring channel is directly exposed to at least one known reference signal, a measuring channel response signal of the exposed measuring channel is ascertained, and a transmission function of the measuring channel is identified based on a known reference signal and based on the measuring channel response signal that is ascertained.

6. Method according to claim 5, wherein the actual transmission behavior of at least one of the measuring channel and actual transmission behavior of the excitation channel is corrected with at least one of the identified transmission function of the measuring channel and with the identified transmission function of the excitation channel.

7. Method according to claim 6, wherein at least one of the actual transmission behavior of the measuring channel and the actual transmission behavior of the excitation channel is corrected in a frequency range by a respective transmitted signal received by the control and analysis unit being separated into orthogonal components, a frequency response of the at least one of the identified transmission function of the measuring channel and the excitation channel for the prevailing excitation frequency being inverted, and sine and cosine functions of an inverted amplitude response that are produced being calculated, and two correction factors, with which the measured orthogonal components are corrected, being calculated using the inverted amplitude response.

8. Method according to claim 7, wherein a prevailing excitation signal is used as a known reference signal is used as at least one of the known reference signal.

9. Method according to claim 8, wherein identification of the transmission function of at least one of the measuring channel and the transmission function of the excitation channel is performed by ascertaining an amplitude response and phase response being recreated by a polynomial.

10. Method according to claim 7, wherein at least one of sine signals with at least different frequency and square-wave signals are used as known reference signals.

11. Method according to claim 7, wherein at least one of sine signals with at least different frequency and different amplitude and square-wave signals are used as known reference signals.

12. Method according to claim 11, wherein identification of the transmission function of at least one of the measuring channel and the transmission function of the excitation channel is performed by ascertaining an amplitude response and phase response recreated by a polynomial.

13. Method according to claim 1, wherein at least one excitation channel is directly exposed to at least one known reference signal, the response signal of the exposed excitation channel is ascertained, and the transmission function of the excitation channel is identified based on the known reference signal and based on an acquired excitation channel-response signal.

14. Coriolis mass flow measuring device, comprising:
at least one measuring tube through which a medium flows,
at least one oscillation generator,
at least one first oscillation sensor,
at least one second oscillation sensor,
at least one control and analysis unit, and
a multiplexer system with n+r inputs and m outputs, n primary signals being able to be delivered to the n inputs of the multiplexer system, and r reference signals can go to r inputs of the multiplexer system,
wherein m>14, n>14, and r>1,
wherein the m outputs of the multiplexer system are connectable via filter systems with inputs of the control and analysis unit so that at least two switchable measuring channels are created via the multiplexer system, and
wherein the control and analysis has means for:
transmitting a first primary measuring signal of interest via at least one first measuring channel to the control and analysis unit from the first oscillation sensor,
transmitting a second primary measuring signal of interest via at least one second measuring channel to the control and analysis unit from the second oscillation sensor,
using the control and analysis unit to ratiometrically calculate at least one derived secondary variable at least indirectly from the primary measuring signals transmitted via the at least one first and at least one second measuring channels,
alternately transmitting the primary measuring signals of interest via at least one first and at least one second measuring channels to the control and analysis unit,
calculating comparison values of the transmitted primary measuring signals from different values for the primary measuring signals transmitted via the different measuring channels, and
using the calculated comparison values as a basis for calculating the derived secondary variable.

15. Coriolis mass flow measuring device according to claim 14, wherein the multiplexer system comprises several separate multiplexers for the creation of the measuring channels and for the creation of excitation channels.

16. Coriolis mass flow measuring device according to claim 14, wherein the first oscillation sensor and the second oscillation sensor have the same mechanical and electrical transmission behavior.

\* \* \* \* \*